US010241825B2

(12) United States Patent
Bohm et al.

(10) Patent No.: US 10,241,825 B2
(45) Date of Patent: *Mar. 26, 2019

(54) TECHNIQUES FOR HYBRID COMPUTER THREAD CREATION AND MANAGEMENT

(71) Applicant: International Business Machines Corporation, Armonk, NY (US)

(72) Inventors: Fraser Bohm, Salisbury (GB); Ivan D. Hargreaves, Southampton (GB); Julian Horn, Eastleigh (GB); Ian J. Mitchell, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,580

(22) Filed: Aug. 29, 2017

(65) Prior Publication Data
US 2017/0357526 A1 Dec. 14, 2017

Related U.S. Application Data

(63) Continuation of application No. 15/460,738, filed on Mar. 16, 2017, which is a continuation of application
(Continued)

(30) Foreign Application Priority Data

Jul. 13, 2012 (GB) .................. 1212509.2

(51) Int. Cl.
*G06F 9/46* (2006.01)
*G06F 9/455* (2018.01)
(Continued)

(52) U.S. Cl.
CPC .............. *G06F 9/46* (2013.01); *G06F 9/3836* (2013.01); *G06F 9/45516* (2013.01);
(Continued)

(58) Field of Classification Search
CPC ...... G06F 9/46; G06F 9/3836; G06F 9/45516; G06F 9/4812; G06F 9/4843; G06F 9/5044
See application file for complete search history.

(56) References Cited

U.S. PATENT DOCUMENTS 5,893,912 A 4/1999 Freund et al.
6,138,169 A 10/2000 Freund et al.
(Continued)

FOREIGN PATENT DOCUMENTS

CN 101149780 A 3/2008
CN 101887367 A 11/2010
(Continued)

OTHER PUBLICATIONS

Bohm et al., "Techniques for Hybrid Computer Thread Creation and Management", U.S. Appl. No. 15/460,703, filed Mar. 16, 2017.
(Continued)

*Primary Examiner* — Camquy Truong
(74) *Attorney, Agent, or Firm* — Stosch Sabo

(57) ABSTRACT

A technique for operating a computer system to support an application, a first application server environment, and a second application server environment includes intercepting a work request relating to the application issued to the first application server environment prior to execution of the work request. A thread adapted for execution in the first application server environment is created. A context is attached to the thread that non-disruptively modifies the thread into a hybrid thread that is additionally suitable for execution in the second application server environment. The hybrid thread is returned to the first application server environment.

1 Claim, 4 Drawing Sheets

Related U.S. Application Data

No. 15/050,555, filed on Feb. 23, 2016, now Pat. No. 9,619,276, which is a continuation of application No. 14/414,666, filed as application No. PCT/IB2013/055390 on Jul. 1, 2013, now Pat. No. 9,367,320.

(51) Int. Cl.
  *G06F 9/48* (2006.01)
  *G06F 9/50* (2006.01)
  *G06F 9/38* (2018.01)

(52) U.S. Cl.
  CPC .......... *G06F 9/4812* (2013.01); *G06F 9/4843* (2013.01); *G06F 9/5044* (2013.01)

(56) References Cited

U.S. PATENT DOCUMENTS

| | | | |
|---|---|---|---|
| 7,350,193 B2 | 3/2008 | Belov et al. | |
| 7,529,946 B2 | 5/2009 | Ray et al. | |
| 7,958,496 B2 | 6/2011 | Bjare et al. | |
| 8,392,913 B2 * | 3/2013 | Clissold | G06F 9/4843 718/1 |
| 8,539,497 B2 * | 9/2013 | Bernabeu-Auban | G06F 21/53 713/168 |
| 9,367,320 B2 | 6/2016 | Bohm et al. | |
| 2003/0217087 A1 | 11/2003 | Chase et al. | |
| 2005/0273783 A1 * | 12/2005 | Tankov | G06F 9/461 718/100 |
| 2009/0089785 A1 | 4/2009 | Marwinski et al. | |
| 2009/0210874 A1 | 8/2009 | Harris et al. | |
| 2011/0106937 A1 | 5/2011 | Upham et al. | |
| 2012/0158960 A1 | 6/2012 | Upham et al. | |
| 2013/0097597 A1 * | 4/2013 | Gibson | G06F 9/45533 717/177 |
| 2016/0239338 A1 | 8/2016 | Bohm et al. | |

FOREIGN PATENT DOCUMENTS

| | | |
|---|---|---|
| CN | 102142985 A | 8/2011 |
| CN | 102236576 A | 11/2011 |
| EP | 1122644 A1 | 8/2001 |
| EP | 2317695 A1 | 5/2011 |
| WO | 2014009846 A1 | 1/2014 |

OTHER PUBLICATIONS

List of IBM Patents or Patent Applications Treated as Related, Aug. 24, 2017. 2 pages.

International Application No. PCT/IB2013/055390, filed Jul. 1, 2013; International Search Report and Written Opinion dated Nov. 21, 2013. 9 pages.

Bohm et al., "Techniques for Hybrid Computer Thread Creation and Management", U.S. Appl. No. 15/689,726, filed Aug. 29, 2017.

Bohm et al., "Techniques for Hybrid Computer Thread Creation and Management", U.S. Appl. No. 15/460,738, filed Mar. 16, 2017.

\* cited by examiner

TECHNIQUES FOR HYBRID COMPUTER THREAD CREATION AND MANAGEMENT

BACKGROUND

This application is generally directed to a computer threads and, more particularly, to techniques for hybrid computer thread creation and management.

As is well known in the computer art, application server environments support environments that mediate between a base computer operating system environment and user applications. Application server environments also provide a number of supporting services to user applications. For example, application server environments provide supporting services such as control of communications between clients and databases, performance monitoring, diagnostic tracing and transaction control services, among others. Many application server environments also provide specialized application programming interfaces tailored to enable users to exploit advanced services in a simple, standardized manner. Examples of application server environments include: Oracle Corporation's WebLogic™, SAP Net Weaver Application Server™, IBM Corporation's WebSphere Application Server™, and IBM Corporation's customer information control system (CICS) Transaction Server™, among others.

Application server environments may operate independently, side-by-side within an operating system environment, or in a nested fashion, with one environment embedded within another. IBM, WebSphere and CICS are trademarks of International Business Machines Corporation, registered in many jurisdictions worldwide. Other product or service names may be trademarks or registered trademarks of others. As is also well known in the art, application server environments take several forms. Some application server environments follow traditional computing paradigms (for example, using traditional procedural programming approaches). Other application server environments follow more recent programming paradigms, such as object-oriented programming and portable programming models like the Java™ model. Java and all Java-related trademarks and logos are trademarks or registered trademarks of Oracle Corporation in the U.S. and other countries.

Where user applications have been created to use the services of, and the programming model provided by, a particular one of these application server environments, serious problems arise in any attempt to move to a different application server environment, or to enable coexistence of applications between different application server environments. These problems are exacerbated by the need to support "software as a service" and cloud computing models, in which applications need to be made mobile between server platforms and across multiple, potentially heterogeneous environments. Various attempts to address this problem have been proposed. One example is the provisioning of wrappers, connectors, or adapters that provide translations of the language and other constructs used by a user application that are specific to a first application server environment into the equivalent language and other constructs that would be used by the user application in a second application server environment. These wrappers, connectors, and adapters disadvantageously add layers of processing overhead between the applications and their environments and thus adversely affect the performance, reliability and serviceability of the applications and the application server environments.

BRIEF SUMMARY

Disclosed are a method, a data processing system, and a computer program product (embodied in a computer-readable storage device) for hybrid computer thread creation and management.

A technique for operating a computer system to support an application, a first application server environment, and a second application server environment includes intercepting a work request relating to the application issued to the first application server environment prior to execution of the work request. A thread adapted for execution in the first application server environment is created. A context is attached to the thread that non-disruptively modifies the thread into a hybrid thread additionally suitable for execution in the second application server environment. The hybrid thread is returned to the first application server environment.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
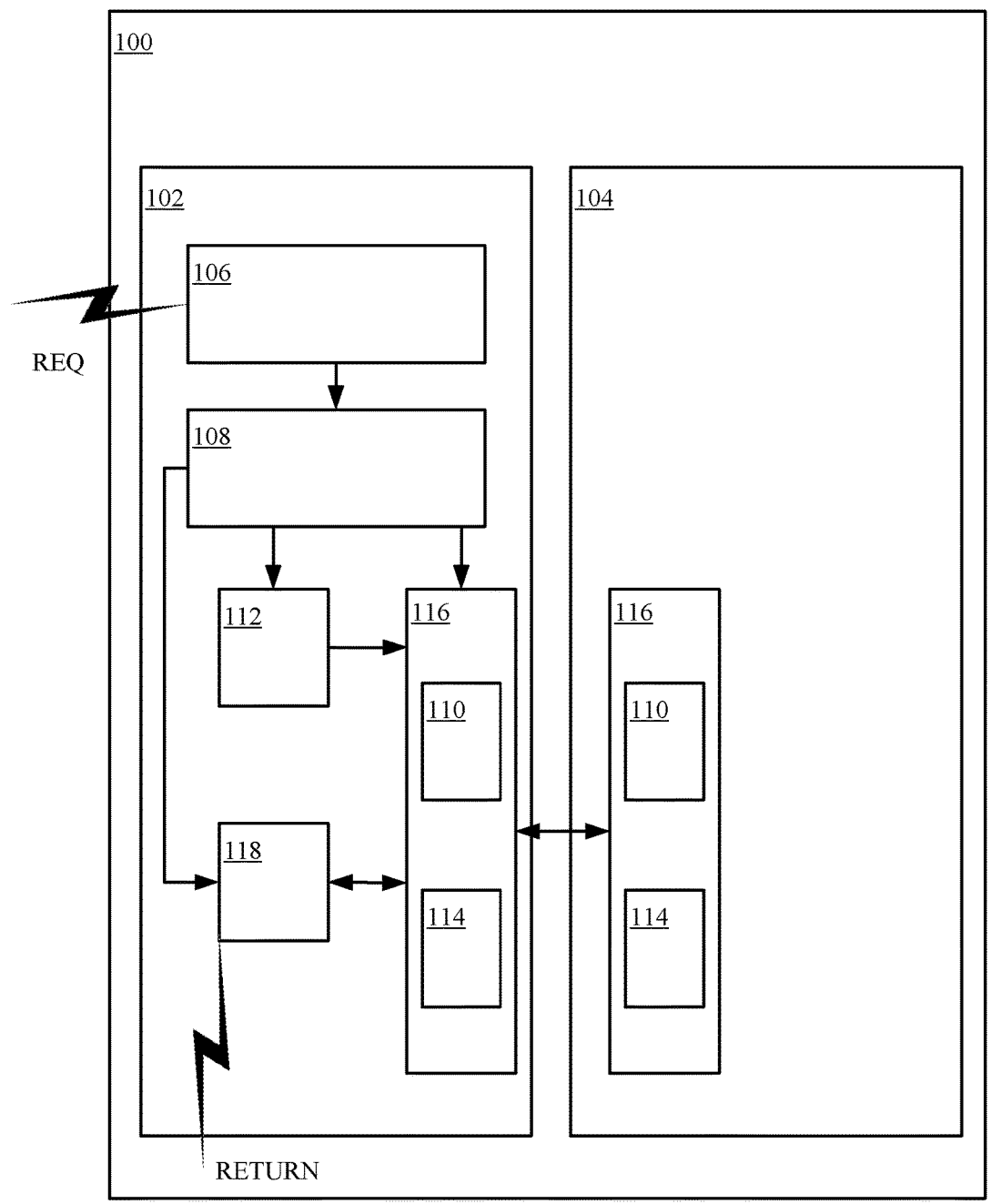
FIG. 1 illustrates the components of a system according to one embodiment of the present disclosure.

The illustrative embodiments provide a method, network controller, and a computer program product (embodied in a computer-readable storage device) for hybrid computer thread creation and management.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

According to the present disclosure, techniques are disclosed by which applications can take advantage of services provided by different application server environments without being bound by the limitations of those environments, and without the need to reprogram applications to make the applications portable between the environments.

According to a first aspect of the present disclosure, a computer system is disclosed that is operable to support an application, a first application server environment, and a second application server environment. The computer system includes: a request interceptor component configured to intercept a work request relating to the application issued to the first application server environment prior to execution of the work request; an executor component, responsive to the request interceptor component, is configured to create a thread adapted for execution in the first application server environment; a thread dispatcher component, responsive to the executor component, is configured to attach a context to the thread to non-disruptively modify the thread into a hybrid thread that is additionally suitable for execution in the second application server environment; and a catcher component, responsive to the thread dispatcher component, is configured to return the hybrid thread to the first application server environment.

The hybrid thread may be operable to execute in the first application server environment and in the second application server environment unmodified. The hybrid thread may comprise first data visible to a server only in the first application server environment and second data visible to a server only in the second application server environment. In one or more embodiments, the first application server environment and the second application server environment are incompatible in their program execution models. In one or more embodiments, only one of the first application server environment or the second application server environment is a procedural program environment. In one or more embodiments, only one of the first application server environment or the second application server environment is an object-oriented program environment. In one or more embodiments, the context comprises transactional control data of one of the application server environments. The context may include transactional control data, security control data, monitoring control data, diagnostic tracing control data, and/or data enabling access to an application programming interface of one of the application server environments.

According to a second aspect of the present disclosure, a method of operating a computer system to support an application, a first application server environment, and a second application server environment is disclosed. The method comprises: intercepting, by a request interceptor component, a work request relating to the application issued to the first application server environment prior to execution of the work request; responsive to the request interceptor component, creating a thread adapted for execution in the first application server environment by an executor component; responsive to the executor component, attaching to the thread, by a thread dispatcher component, a context to non-disruptively modify the thread into a hybrid thread that is additionally suitable for execution in the second application server environment; and responsive to the thread dispatcher component, returning the hybrid thread to the first application server environment by a catcher component.

The hybrid thread may be operable to execute in the first application server environment and the second application server environment unmodified. The hybrid thread may comprise first data visible to a server only in the first application server environment and second data visible to a server only in the second application server environment. In at least one embodiment, the first application server environment and the second application server environment are incompatible in their program execution models. In one or more embodiments, only one of the first application server environment or the second application server environment is a procedural program environment. In another embodiment, only one of the first application server environment or the second application server environment is an object-oriented program environment. In at least one embodiment, the context comprises transactional control data of one of the application server environments. The context may comprise transactional control data, security control data, monitoring control data, diagnostic tracing control data, and/or data enabling access to an application programming interface of one of the application server environments.

According to a third aspect of the present disclosure, a computer program product that includes computer program code embodied on a computer-readable storage device that, when executed by a data processing system, configures the data processing system to execute the process described above is disclosed.

In a typical commercial data processing system of the present day, there is often a mixture of processing environments, some of which, like IBM's high-performance and high-integrity customer information control system (CICS) transaction processing products, follow a conventional, though highly advanced and reliable, procedural programming and operational paradigm, and some of which, like IBM's WebSphere Application Server, offer an built-in opportunity to exploit object-oriented and Java processing environments. As should be clear to one of ordinary skill in the art, CICS and WebSphere are merely two examples of application server environments; and many other such application server environments are supplied by other vendors.

CICS has for some time provided facilities for permitting a level of interoperability between the normal CICS environment and programs implementing a Java model. However, these facilities have certain limitations—for example, they do not apply to processing threads initiated from inside the Java Virtual Machine (JVM) as a result of a Thread.Start instruction. Such threads are not able to participate in a CICS task and cannot make use of the CICS application programming interface (API) and services. This is particularly unfortunate when users have a need to port server side components to run in the JVM under CICS, as it is a very common pattern for such components (Jetty, Axis 2, Liberty, etc.) to attach worker threads from inside the JVM to satisfy external requests. When such components are hosted in CICS it is almost certain that such worker threads will require access to CICS services or API, and this cannot be achieved using the facilities presently provided. The approaches to improving the situation implemented in various application server environments thus far involve significant reprogramming, both of the application server environments and of the applications themselves, and are clearly disadvantageous.

A first approach is to completely remove the listening/dispatching component from one application server environment and to re-implement it using the infrastructure provided by a second application server environment. As noted above, this approach has the disadvantage that it requires a significant rewrite of the ported server side components. A second approach is to alter the listening/dispatching logic of a first application server environment to issue an additional call to the second application server environment to start another transaction. The transaction is started outside the first application server environment and must then be synchronized with the calling component inside the first application server environment. The second approach again requires a significant re-write of the dispatching/listening components to be made workable. The second approach also requires the first application server environment code to know the characteristics of the required task environment of the second application server environment.

Turning to FIG. 1, a computer system 100 operable to support an application, a first application server environment 102, and a second application server environment 104 is illustrated. In one embodiment, the first application server environment 102 is a CICS application server environment and the second application server environment 104 is a Java-enabled environment, such as the WebSphere Application Server. Computer system 100 comprises a request interceptor component 106 for intercepting a work request, relating to the application, issued to the first application server environment 102 prior to execution of the work request. In one or more embodiments, the work request could be, for example, a Java Thread.Start request.

Computer system 100 further comprises an executor component 108, responsive to the request interceptor component 106, for creating a thread 110 adapted for execution in the first application server environment 102. There is also provided a thread dispatcher component 112, responsive to the executor component 108, for attaching to the thread 110 a context 114 to non-disruptively modify the thread 110 into a hybrid thread 116 that us additionally suitable for execution in the second application server environment 104. A catcher component 118 is responsive to the thread dispatcher component 112, for returning the hybrid thread 116 to the first application server environment 102. The computer system 100, as described, enables the hybrid thread 116 to execute in the first application server environment 102 and in the second application server environment 104 without modification of the environments 102 and 104.

Figure 2:
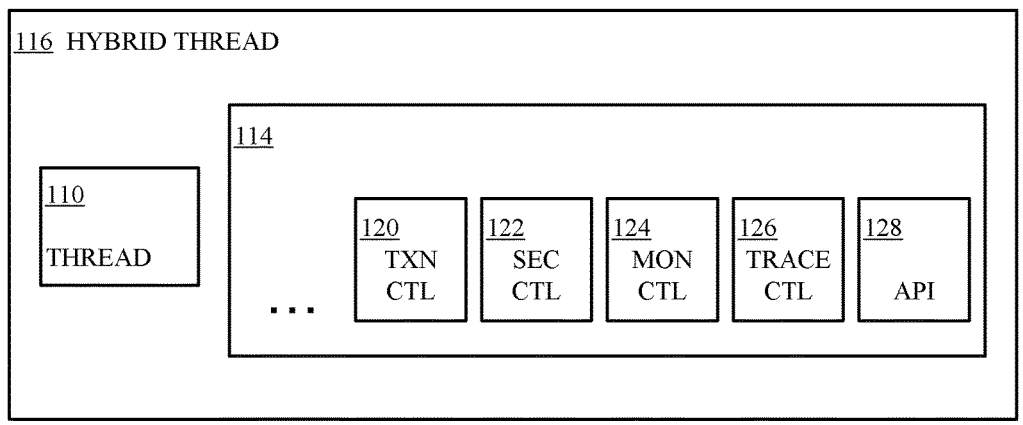
FIG. 2 represents a detailed view of a hybrid thread according to an embodiment of the present disclosure.

In the computer system 100 as described, the hybrid thread 116 comprises first data visible to a server only in the first application server environment 102 and second data visible to a server only in the second application server environment 104. Advantageously, the computer system 100 as described is operable in systems in which the first application server environment 102 and the second application server environment 104 are incompatible in their program execution models. For example, one of the application server environments 102, 104 could be a procedural program environment, while the other application server environment 104, 102 could be an object-oriented program environment. The context 114 is attached to the thread 110 to create the hybrid thread 116. As is shown in FIG. 2, the context 114 may comprise transactional control data 120, security control data 122, monitoring control data 124, diagnostic tracing control data 126, and/or data 128 enabling access to an application programming interface (API) of one of the application server environments 102, 104.

Figure 3:
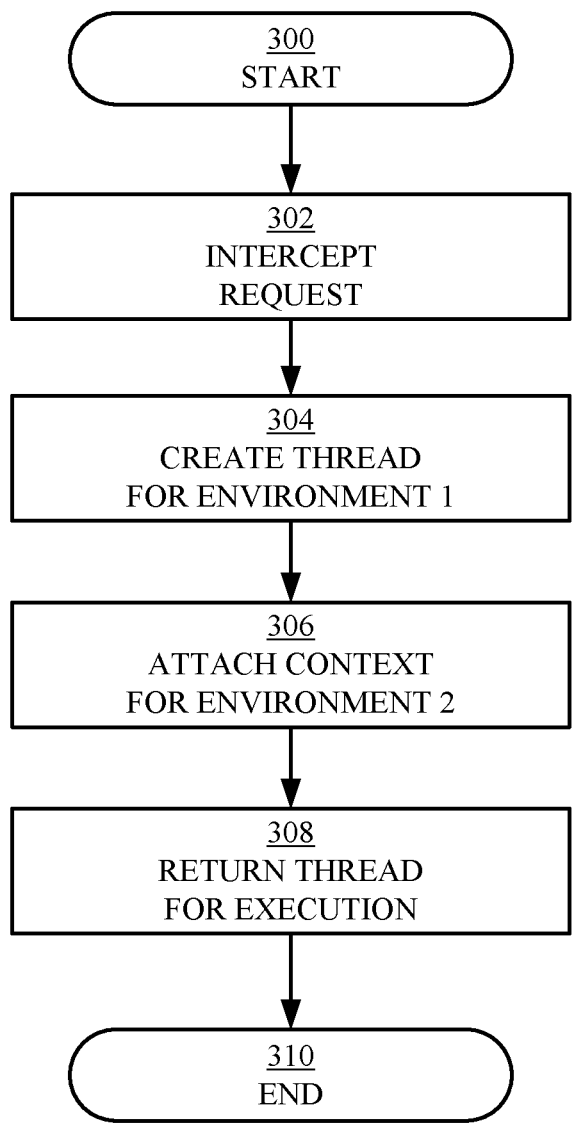
FIG. 3 represents a flow diagram illustrating a process according to one embodiment of the present disclosure.

Turning to FIG. 3, a process for operating a computer system 100 to support an application, a first application server environment 102, and a second application server environment 104 is illustrated. The process includes a START block 300, a block 302 that intercepts work requests, e.g., using the request interceptor component 106, relating to the application issued to the first application server environment 102 prior to execution of the work request. The process continues at block 304 where, responsive to the request interceptor component 106, a thread 110 adapted for execution in the first application server environment 102 is created by an executor component 108. Then, responsive to the executor component 108, the process continues by attaching (in block 306) to the thread 110, by a thread dispatcher component 112, the context 114 to non-disruptively modify the thread 110 into the hybrid thread 116 that is additionally suitable for execution in the second application server environment 104. Responsive to the thread dispatcher component 112, the catcher component 118 returns, in block 308, the hybrid thread 116 to the first application server environment 102, and the process completes, for this instantiation, in block 310.

Thus, in the CICS and Java embodiment, there is provided a combined (partially in Java, partially native services) thread dispatching service that can be called from any Java thread (CICS attached or not) that will provide a Java thread and related CICS task environment such that the thread is also a CICS task and can make full use of CICS API and services. In one embodiment, the thread dispatching service is used to implement a Java ThreadExecutor—this allows the advantages of the disclosed embodiments to be achieved with no code changes to the dispatching/listening components and minimal changes to the configuration of the ported component.

Figure 4:
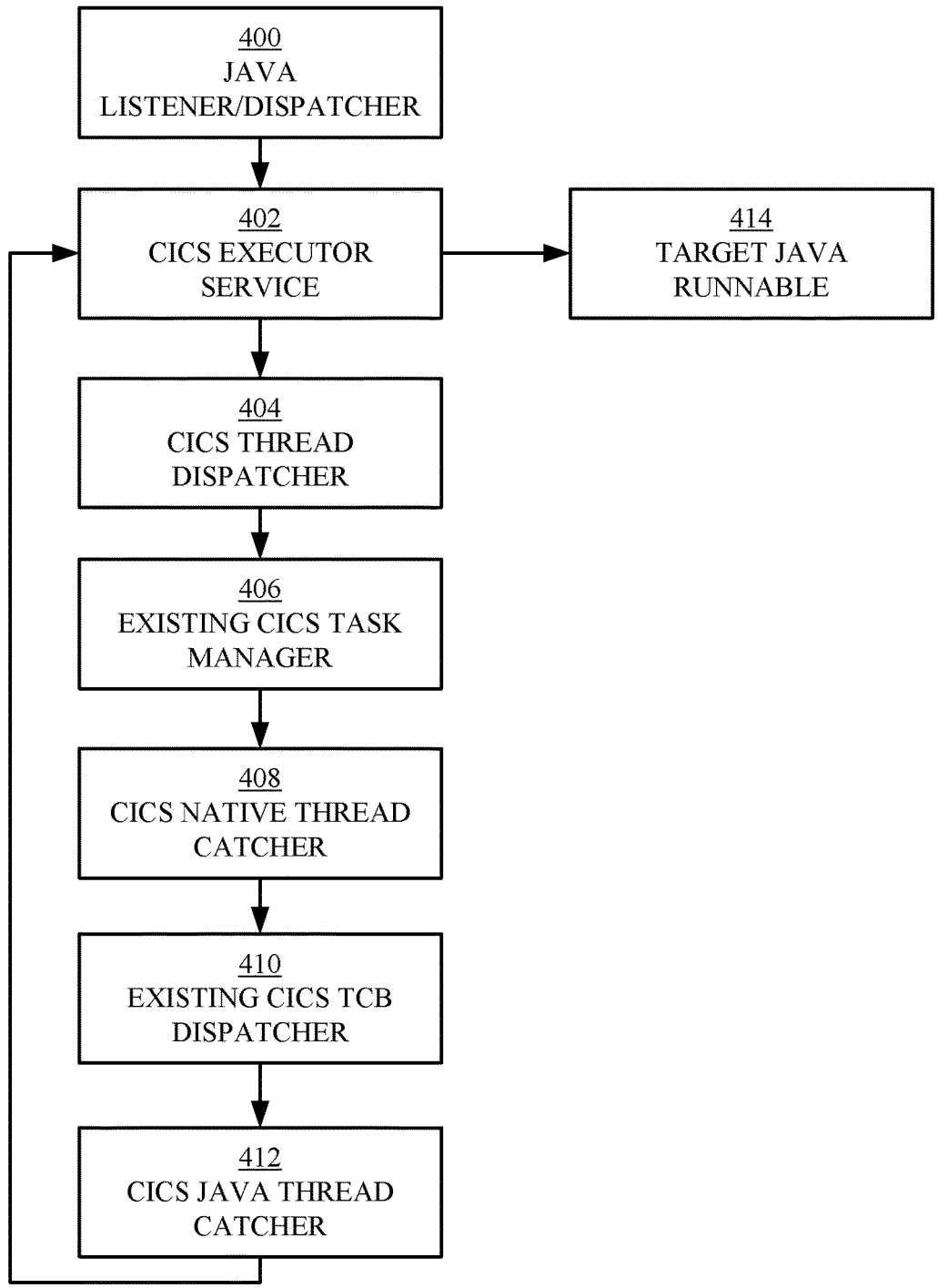
FIG. 4 represents a flow of control in an exemplary customer information control system (CICS) and Java embodiment of the present disclosure.

Turning to FIG. 4, the flow through a set of components of a CICS and Java embodiment is illustrated. The Java listener/dispatcher in block 400 receives the work request and calls the CICS executor service in block 402. The CICS executor service creates the base Java thread and then invokes the CICS thread dispatcher in block 404. The CICS thread dispatcher uses the services of the existing CICS task manager in block 406. The CICS native thread catcher is employed in block 408 and the existing CICS task control block dispatcher is employed in block 410 to create and attach the CICS context to the thread, thereby creating a hybrid thread. The thread is then passed back by the CICS Java thread catcher in block 412 to the CICS executor service in block 402, which emits the target Java executable component in block 414.

Accordingly, techniques have been disclosed herein that advantageously facilitate the creation and management of hybrid computer threads.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer system configured to support an application, a first application server environment, and a second application server environment, the system comprising:
- a memory and a processor, wherein the processor is configured to execute instructions for each of the components stored in the memory;
- a request interceptor component configured to intercept a work request relating to the application issued to the first application server environment prior to execution of the work request;
- an executor component configured to, responsive to the request interceptor component, create a thread adapted for execution in the first application server environment;
- a thread dispatcher component configured to, responsive to the executor component, attach a context to the thread to non-disruptively modify the thread into a hybrid thread that is additionally suitable for execution in the second application server environment;
- wherein the context comprises transactional control data of one of the application server environments, security control data of one of the application server environments, monitoring control data of one of the application server environments, diagnostic tracing control data of one of the application server environments, and data enabling access to an application programming interface of one of the application server environments;
- wherein the hybrid thread is operable to execute in the first application server environment and in the second application server environment without requiring modification of the first and second application server environment;
- wherein the hybrid thread comprises first data that is only visible to a server in the first application server environment and second data is only visible to another server in the second application server environment;
- wherein the first application server environment and the second application server environment are incompatible in their program execution models; and
- wherein only one of the first application server environment and the second application server environment is a procedural program environment; and
- a catcher component configured to, responsive to the thread dispatcher component, return the hybrid thread to the first application server environment.

* * * * *